United States Patent
Hamada

(10) Patent No.: US 7,863,783 B2
(45) Date of Patent: Jan. 4, 2011

(54) BRUSHLESS TYPE OF VEHICULAR AC GENERATOR

(75) Inventor: Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 302 days.

(21) Appl. No.: 12/213,804

(22) Filed: Jun. 24, 2008

(65) Prior Publication Data
US 2008/0315694 A1    Dec. 25, 2008

(30) Foreign Application Priority Data
Jun. 25, 2007   (JP) ............................. 2007-166160

(51) Int. Cl.
*H02K 9/02* (2006.01)
(52) U.S. Cl. ................... 310/59; 310/68 D; 310/52; 310/53; 310/64
(58) Field of Classification Search ............ 310/64, 310/52–59, 68 D; *H02K 9/02*
See application file for complete search history.

(56) References Cited

U.S. PATENT DOCUMENTS

| | | | | |
|---|---|---|---|---|
| 4,262,224 A | * | 4/1981 | Kofink et al. | 310/54 |
| 5,449,961 A | * | 9/1995 | Ludwig et al. | 310/58 |
| 6,072,253 A | * | 6/2000 | Harpenau et al. | 310/58 |
| 6,078,116 A | * | 6/2000 | Shiga et al. | 310/60 R |
| 6,441,527 B1 | * | 8/2002 | Taji et al. | 310/201 |
| 6,724,108 B2 | * | 4/2004 | Nakano | 310/68 D |
| 6,809,443 B2 | * | 10/2004 | Nakamura et al. | 310/68 D |
| 6,812,604 B2 | * | 11/2004 | Braun et al. | 310/68 D |
| 6,897,583 B2 | * | 5/2005 | Doeffinger et al. | 310/68 D |
| 2006/0091743 A1 | * | 5/2006 | Iwasaki et al. | 310/58 |

FOREIGN PATENT DOCUMENTS

JP   A-07-336945   12/1995
JP   A-2002-095215   3/2002

OTHER PUBLICATIONS

English-language translation of Notification of Reasons for Rejection for Japanese Application No. 2007-166160 dated Jan. 27, 2009.

* cited by examiner

*Primary Examiner*—Karl I Tamai
*Assistant Examiner*—Terrance Kenerly
(74) *Attorney, Agent, or Firm*—Oliff & Berridge, PLC

(57) ABSTRACT

A brushless alternating current generator for vehicles comprises a stator, rotor, field winding, rectifier, housing, cover, and extension member. The rectifier has plural rectifying elements to rectify a voltage from the stator winding and output the rectified voltage and a radiating fin to which the rectifying elements are attached. The housing has a side wall and houses both the stator and the rotor and has an end face to which electric parts including the rectifier are attached. The side wall is along the axial direction. The end face is along the radial direction. Both the side wall and the radiating fin are mutually adjacent to provide a gap in the radial direction. The cover encloses the end face of the housing and has plural air inlets that takes in cooling air. The extension member is secured to the cover and extends into the gap in the axial direction.

13 Claims, 5 Drawing Sheets

BRUSHLESS TYPE OF VEHICULAR AC GENERATOR

CROSS REFERENCES TO RELATED APPLICATIONS

The present application relates to and incorporates by reference Japanese Patent Application No. 2007-166160 filed on Jun. 25, 2007.

BACKGROUND OF THE INVENTION

1. Field of the Invention

The present invention relates to a vehicular alternating current generator (i.e., alternator), and in particular, to a brushless type of alternating current generator mounted in motortrucks, construction machines, agricultural machines, and others.

2. Description of the Related Art

In recent years, manufactures for passenger automobiles and motortrucks have been improving the engines so as to comply emission standards. This improvement tends to increase the ambient temperature around the components mounted on an engine. Also, safety devices, additional power supplies, and other in-vehicle amenities have increased gradually, whereby electrical loads to an alternating current (AC) generator (alternator) in each vehicle are on the increase.

The vehicular AC generator can be divided into two types in terms of its brush structure. One type is an AC generator with brushes, which are mainly for passenger automobiles. The other type is known as a brushless type of AC generator, which is generally longer operating line. This generator is mainly for motortrucks which travel for a long time, and construction and agricultural machines obliged to work in adverse environments with dust. The brushless type of AC generator is disclosed by Japanese Patent Laid-open Publication No. 2002-95215.

In the brushless type of AC generator disclosed by the publication, there is a housing which encloses various components. However, the housing has no cooling windows formed through its side walls, because the existence of the cooling windows may allow inhalation of foreign materials and liquid from the outside and also physical damage from the outside. This may result in short-circuited or damaged electrical parts. In addition, the electrical parts such as a rectifier are generally protected by the housing side walls. Cooling for such electrical parts is realized by external cooling fans screwed to the rotary shaft of the generator.

Recent needs for the AC generator involve making it compact in size and raising its output. Such needs are met by enlarging the outer diameter of a stator mounted in the generator, elongating the stack thickness of the stator, and/or reducing the resistance of windings wound in the stator. However, there still remains a problem that the higher output causes the internal electric parts to have higher temperature.

Of course, one known countermeasure is to increase the mount and/or speed of air blown by the cooling fans. However, the external fans provided in the brushless type of AC generator is impossible to increase their outer diameters, due to a limitation in fan size along the radial direction.

Another countermeasure is to increase the number of fan blades and/or the axial area of the fan blades. However, this measure may decrease the strength of the fan blades, which therefore limits the increase in the number and/or area of fan blades. This makes it difficult to obtain a desired speed and/or amount of cooling air.

Still another countermeasure is to narrow the gap between radiating fins of electric parts, such as the rectifier, and side walls of the housing so that the cooling air is allowed to sufficiently pass around the radiating fins and through the inside of the housing. However, this narrowed-gap technique tends to cause foreign matters to be accumulated in the gap, because of a reduction in the creeping distance (i.e., clearance or insulating gap) therebetween. The accumulated foreign matters may cause an electrical short circuit, reducing operational reliability of the generator.

SUMMARY OF THE INVENTION

The present invention has been made in consideration of the above various difficult situations, and an object of the present invention is to provide a brushless type of alternating current generator that is able to improve cooling performance of electric parts, such as a rectifier, mounted therein and prevent the operational reliability from being lowered in terms of the clearance between the radiating fins of the electric parts and housing side walls.

In order to realize the above object, the present invention provides, as its basic structure, a brushless alternating current generator for vehicles, comprising: a stator shaped to have an inner circumferential surface and provided with a stator winding; a rotor disposed in the inner bore of the stator so as to face the inner circumferential of the stator, the rotor having a rotary shaft providing an axial direction therealong; a field winding that generates magnetic flux to the rotor; a rectifier having a plurality of rectifying elements to rectify a voltage from the stator winding and output the rectified voltage and a radiating fin to which the rectifying elements are attached; a housing that has a side wall and houses both the stator and the rotor and has an end face to which electric parts including the rectifier are attached, the side wall being along the axial direction, the end face being along a radial direction perpendicular to the axial direction, and both the side wall and the radiating fin being mutually adjacent to provide a gap therebetween in the radial direction; a cover that encloses the end face of the housing and has a plurality of air inlets that takes cooling air into an inside of the cover; and an extension member that is secured to the cover and that extends into the gap in the axial direction.

This allows the extension member to be present in the gap between the radiating fin of the rectifier and the side wall of the housing. Thus the extension member acts as a baffle member against the flow of cooling air passing the gap, so that the cooling air is forced to pass along and through the radiating fin more strongly, improving the cooling performance to the rectifier.

It is preferred that, by way of example, the extenuation extends into the gap to provide a distance of 1.5 mm or less between the extenuation member and the radiating fin. Thus it is possible to reliably interfere with the flow of the cooling air through the gap, resulting in reliable cooling of the radiating fin. In addition, the distance of 1.5 mm or less makes it possible to prevent deterioration of work of assembling the cover. Such a design for deliberately (or positively) making the gap smaller speeds up the cooling air passing the gap, more effectively cooling the rectifier.

BRIEF DESCRIPTIONS OF THE DRAWINGS

DETAILED DESCRIPTION OF THE PREFERRED EMBODIMENTS

Referring to the accompanying drawings, the brushless type of alternating current (AC) generator for vehicles, called an alternator, according to an embodiment of the present invention will now be described.

Figure 1:
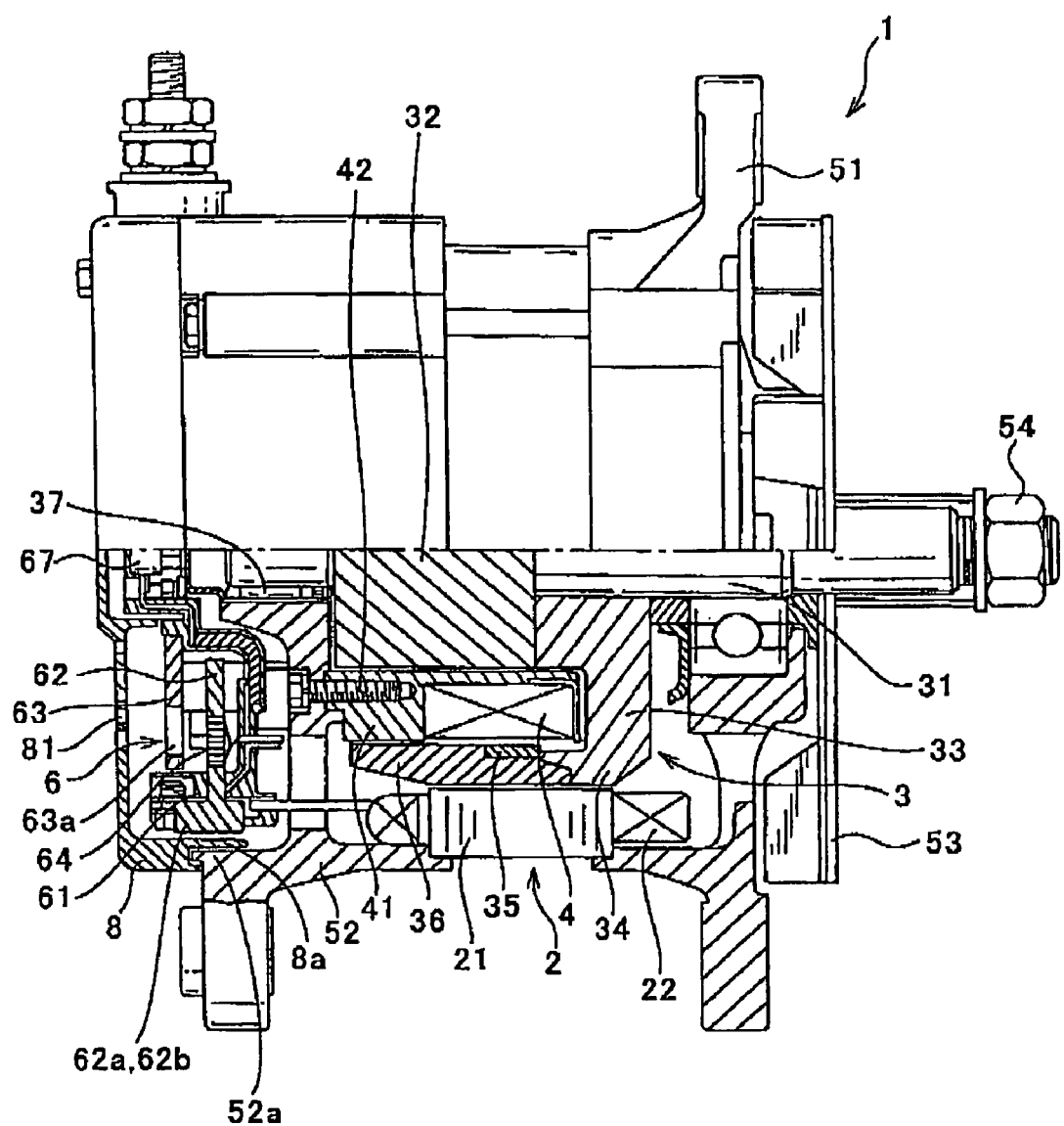
FIG. 1 is a partially sectioned side view showing the overall configuration of a brushless type of vehicular AC generator according to an embodiment of the present invention.
Figure 2:
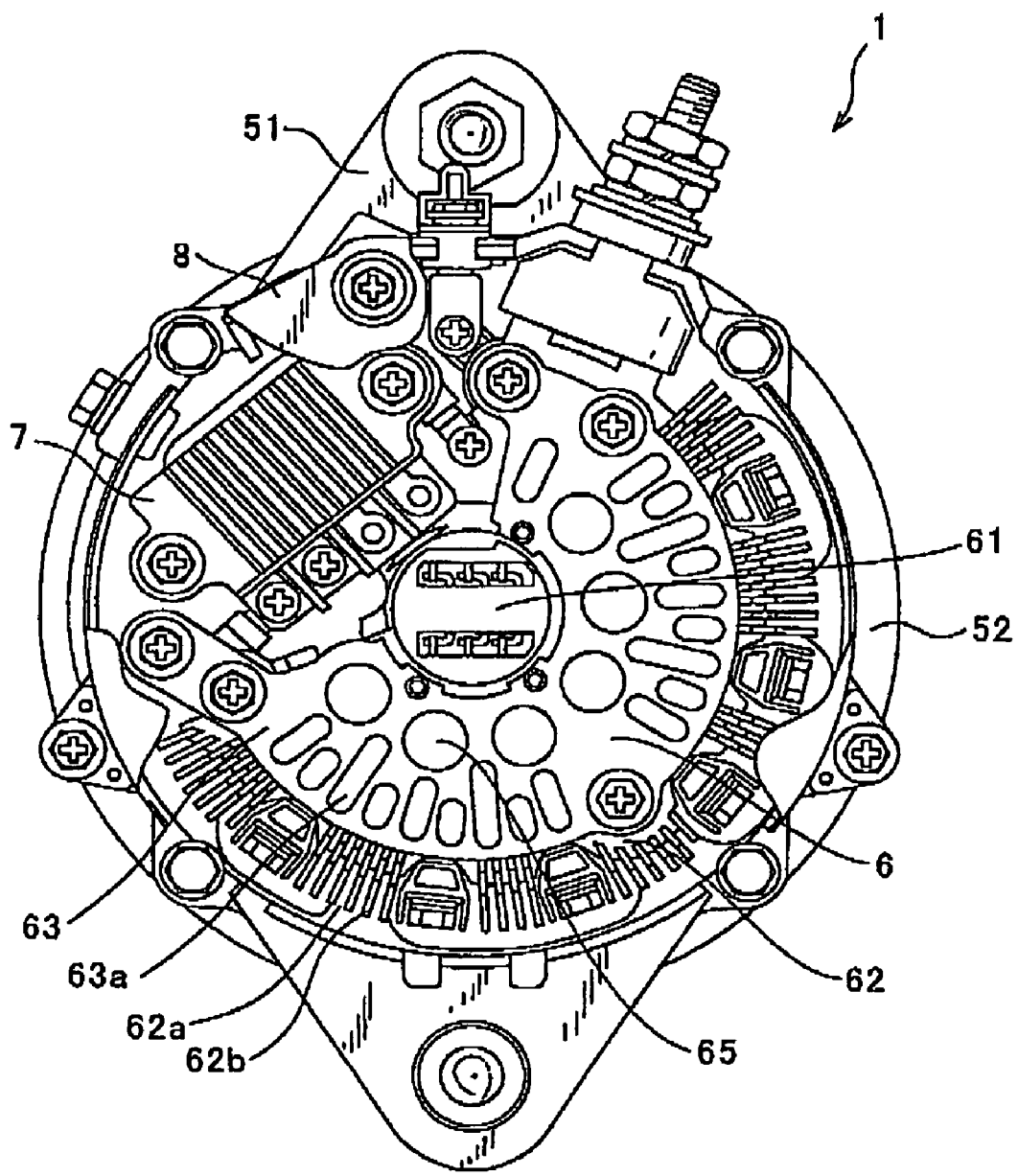
FIG. 2 is a side view showing, with a rear cover removed, a rear side of the AC generator.

FIGS. 1 and 2 show a brushless type of AC generator 1 according to the embodiment, in which the AC generator (alternator) 1 is provided with a stator 2, a rotor 3, field windings 4, a front housing 51, a rear housing 52, a rectifier 6, a regular 7, and a rear cover 8.

The stator 2, which functions as an armature, comprises a stator core 21 and stator windings wound around the stator core 21. The rotor 3, which functions as a field generator, is located to face the inside circumferential surface of the stator 2. This rotor 3 comprises a rotary shaft 31, rotary yoke portions 32 and 33 rotatable with the rotary shaft 31, an unguisform (claw shaped) magnetic pole 34 integral with the rotary yoke portion 33, and an unguis-form magnetic pole 36 integral with the unguis-form magnetic pole 34 by a ring-like support member 35. The rotary shaft 31 has a rear end (the leftward end in FIG. 1), on which a bearing 37 is arranged to rotatably support this rotary shaft 31.

The field winding 4, which is wound about a stator yoke portion 41, generates magnetic flux to be supplied to the rotor 3. The stator yoke portion 41 is a cylindrical member and is fixed to the rear housing 52 by means of a bolt 42. The stator yoke portion 41 constitutes a part of the magnetic field constituted by the rotor 3.

The front housing 51 and the rear housing 52 support the stator 2 and the rotor 3. The bearing 37 is press fitted and fixed to the rear housing 52. An end portion of the rotary shaft 31 is projected from the front housing 51. A cooling fan 53 and a pulley (not shown) are clamped by a nut 54 for fixation to the projected rotary shaft 31. The regulator 7 adjusts the output voltage of the AC generator 1 by interrupting the excitation current supplied to the field winding 4.

An explanation is given in detail hereinafter on the rectifier 6 and the rear cover 8. The rectifier 6 includes a high-side (or positive-side) radiating fin (cooling fin) 62 and a low-side (or negative side) radiating fin (cooling fin) 63, which are stacked face to face, being apart from each other in the axial direction with an interposition of a terminal base 61.

The high-side radiating fin 62 has six mounting holes passing therethrough, with six high-side rectifying elements 64 being press fitted and attached thereto. Similarly, the low-side radiating fin 63 has six mounting holes passing therethrough, with six low-side rectifying elements 65 being press fitted thereto. A set of three high-side rectifying elements 64 and three low-side rectifying elements 65 constitutes a three-phase full-wave rectifying circuit. The rectifier 6 of the present embodiment has two sets of such three-phase full-wave rectifying circuits to rectify the output voltage of the stator winding 22, for externally outputting the output current through output terminals fixed to the radiating fin 62.

In the present embodiment, the low-side and high-side rectifying elements mean rectifying elements connected to the higher potential side and lower potential side of the power source, respectively. The low-side and high-side radiating fins mean radiating fins disposed at the low-side and high-side rectifying elements, respectively.

In addition, the rectifier 6 has three auxiliary diodes 67 which rectify the voltage induced to the stator winding 22 to supply excitation current to the field winding 4. The auxiliary diodes 67 are attached to the terminal base 61. The radiating fin 62 has an outer peripheral portion which is provided with a plurality of auxiliary fins 62a each having a length larger than the thickness of the fixing portion of the rectifying elements 64, along the axial direction of the rotor 3, and axial vents (i.e., cooling air holes) 62b formed between these auxiliary fins 62a.

The rear cover 8 protects the electrical components consisting of the rectifier 6 and the regulator 7, and has a plurality of suction holes 81 for introducing cooling air into the interior (the side of the electrical components), and a skirt portion 8a, an extended portion, made of a resin material, which is disposed between a side wall face 52a of the rear housing 52 and the radiating fin 62. As shown in FIG. 1, the side wall face 52a of the rear housing 52 and the radiating fin 62 are adjacent to each other in the vertical direction with respect to the rotary shaft 31, with the rear cover 8 being partially extended along the rotary shaft to form the skirt portion 8a between the side wall face 52a and the radiating fin 62. The skirt portion 8a is inclined toward the side of the side wall face 52a in such a way that the radial thickness of the skirt portion 8a is reduced toward an end thereof.

Figure 3:
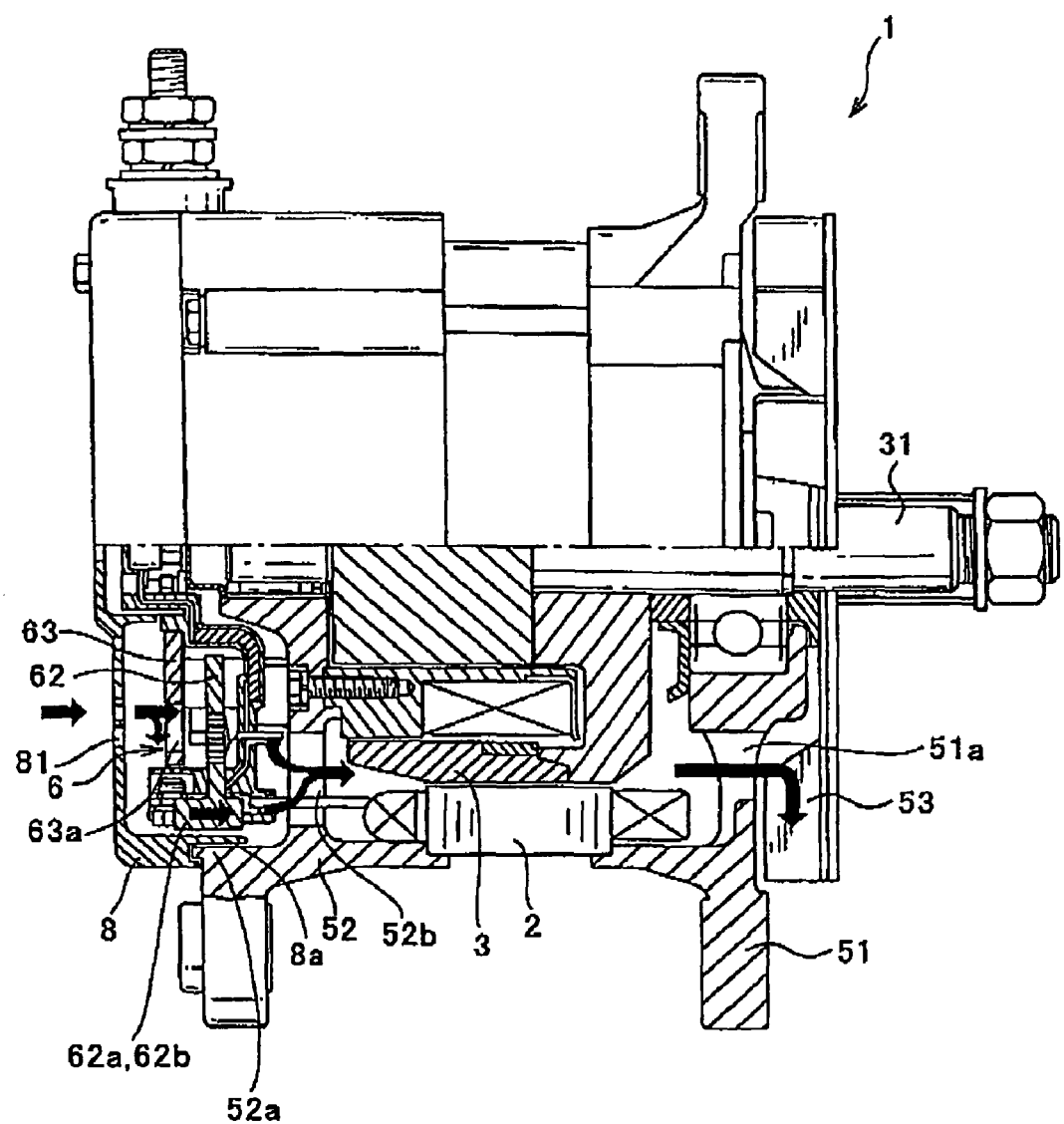
FIG. 3 is a partial sectional view illustrating the passages of cooling air flowing through the AC generator.
Figure 4:
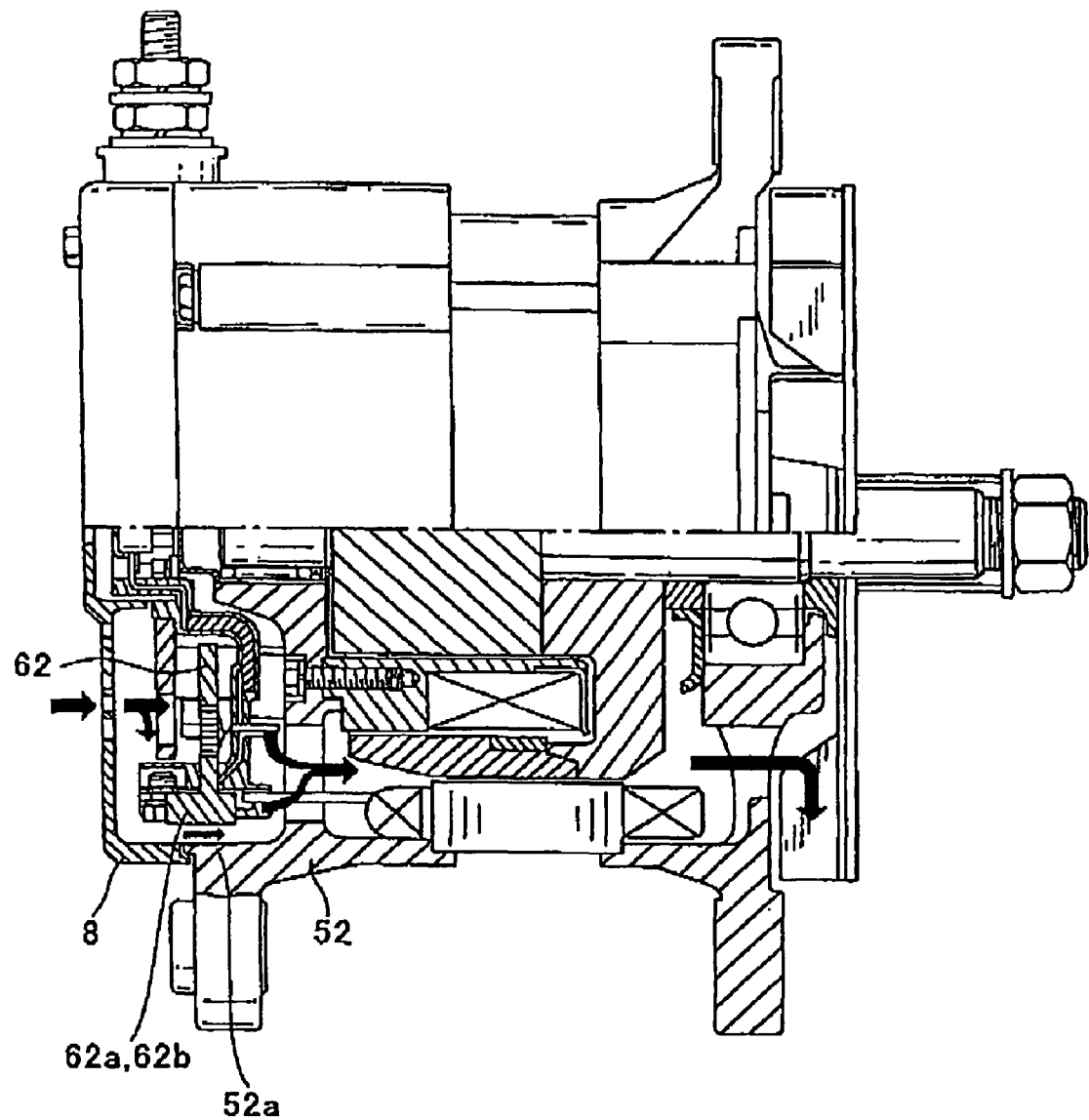
FIG. 4 is a partial sectional view illustrating the passages of cooling air flowing through a conventional brushless type of vehicular AC generator.

FIG. 3 is an explanatory view of vent paths for passing cooling air in the AC generator 1 of the present embodiment. FIG. 4 is an explanatory view of vent paths for passing cooling air in an AC generator having a convention structure, without having a skirt portion. In these figures, the flow of the cooling air is indicated by the thick arrows.

As shown in FIG. 3, in the AC generator 1 of the present embodiment, upon rotation of the cooling fan 53 with the rotary shaft 31, cooling air is introduced into the inner space of the rear cover 8 via the suction holes 81 formed in the rear cover 8. The cooling air then passes through holes 63a formed in the radiating fin 63 of the rectifier 6 and the auxiliary fins 62a formed on the outer peripheral side of the radiating fin 62 to cool the radiating fins 63 and 62. Thereafter, the cooling air passes through a suction port 52b of the rear housing 52 and is discharged from an exhaust port 51a of the front housing 51 via an inner space of the rear housing 52 (the space accommodating the stator 2 and the rotor 3). Since the AC generator 1 of the present embodiment is arranged with the skirt portion 8a between the auxiliary fins 62a of the radiating fin 62 and the side wall face 52a of the rear housing 52, the gap on the outer peripheral side of the auxiliary fins 62a is narrowed. In this way, the relative proportion of the amount of the cooling air that flows through this gap without contributing to the cooling of the rectifier 6, can be reduced.

On the other hand, as shown in FIG. 4, the AC generator of the convention structure has a large gap on the outer peripheral side of the auxiliary fins 62a. Due to this structure, the relative proportion of the amount of the cooling air that flows through the gap without contributing to the cooling of the rectifier 6, is increased.

As described above, the AC generator 1 of the present embodiment permits the interposition of the skirt portion 8a of the rear cover 8 into the gap between the high-side radiating fin 62 of the rectifier 6 and the side wall face 52a of the rear housing 52. Owing to this structure, the vent path for the cooling air passing through this gap can be ensured to pass along the radiating fin 62 or through the through hole 63a of the radiating fin 63, to thereby enhance the cooling performance of the rectifier 6.

Also, by radially reducing the thickness of the skirt portion 8a toward the end thereof for the inclination of the skirt portion to the side of the side wall face 52a, the cooling air can be prevented from turbulently flowing at the end portion of the skirt portion 8a. Further, the gradual enlargement of the gap between the side wall face 52a and the auxiliary fins 62a toward the end portion of the skirt portion 8a, may hardly cause foreign matters to accumulate between the auxiliary fins 62a and the skirt portion 8a.

Figure 5:
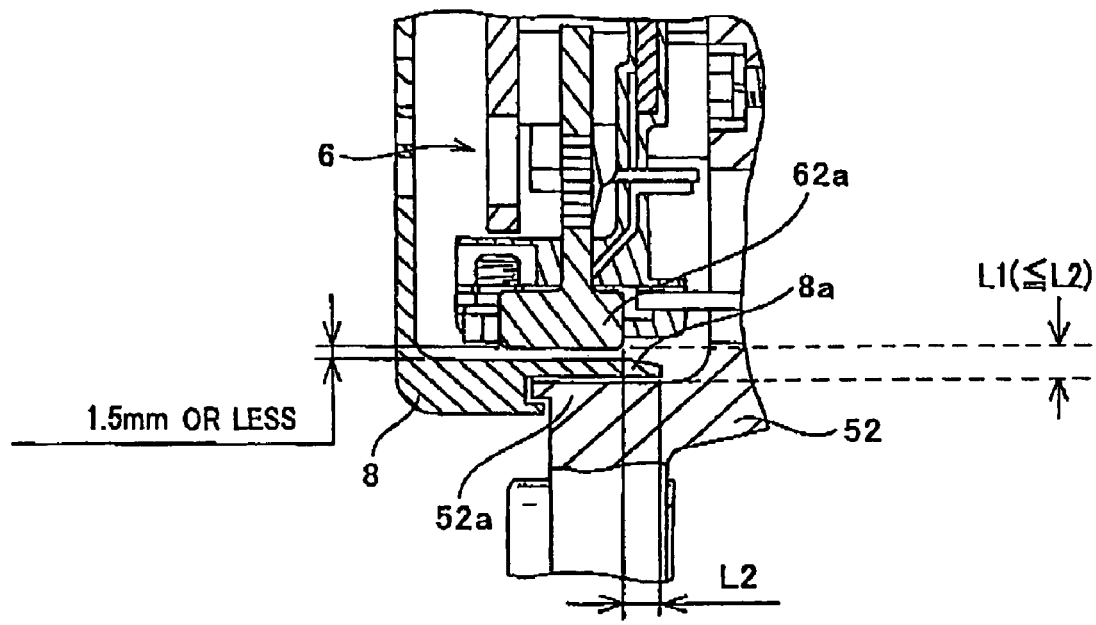
FIG. 5 is a partial sectional view showing a desired positional relationship in a skirt portion of the AC generator shown in FIG. 1.

FIG. 5 is a partial sectional view showing a desired positional relationship in the vicinity of the skirt portion 8a. As shown in FIG. 5, the distance between the skirt portion 8a and the auxiliary fins 62a is set to 1.5 mm or less. Thus, the flow of the cooling air through the gap between the auxiliary fins 62a and the skirt portion 8a can be interfered or blocked to reliably cool the rectifier 6. In addition, the gap of about 1.5 mm can prevent deterioration in the workability at the time when the rear cover 8 is assembled. The design for deliberately (or positively) making the gap smaller speeds up the cooling air passing the gap, more effectively cooling the rectifier.

In the present embodiment, the positional relationship is set to satisfy an inequality expression $L2 \geq L1$, where reference $L1$ represents the distance between the side wall face 52a and the auxiliary fins 62a (e.g., 5 mm), which distance is required for ensuring the insulation properties, and reference $L2$ represents the length of the projection of the skirt portion 8a from an end face of the auxiliary fins 62a. This positional relationship may ensure a creeping distance, which is sufficient for ensuring the insulation properties, between the auxiliary fins 62a and the side wall face 52a of the rear housing 52. Thus, reliability can be prevented from being deteriorated, which reliability would otherwise be deteriorated by short circuiting, for example, between the auxiliary fins 62a and the side wall face 52a of the rear housing. This provides the rectifier with high resistance against water or liquid.

Figure 6:
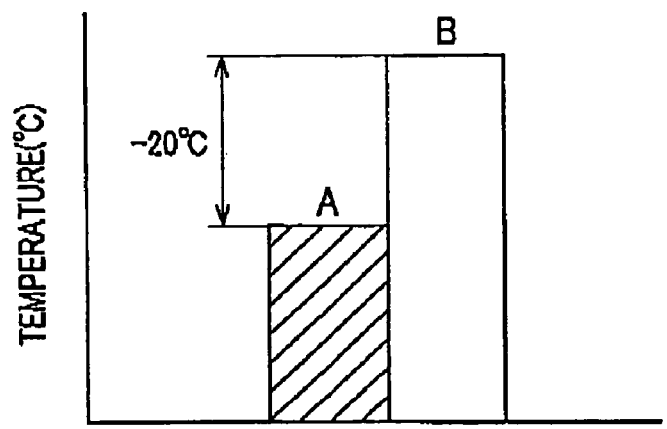
FIG. 6 shows comparative measurement results of the temperature between a rectifier in the embodiment and a rectifier in the convention structure.

FIG. 6 shows a comparative measurement results of the temperature between the rectifier in the embodiment and a rectifier in the convention structure. In FIG. 6, "A" represents the temperature of the rectifying elements of the rectifier 6 in the AC generator 1 according to the present embodiment (e.g., the temperature of the high-side rectifying elements 64), and "B" represents the temperature of the rectifying elements of the rectifier in an AC generator having the convention structure. As can be seen from FIG. 6, the cooling performance was enhanced by about 20° C. by improving the vent paths for cooling with the aid of the skirt portion 8a.

The present invention is not limited to the embodiment described above, but various variations may be made within the spirit of the present invention. For example, as in the embodiment described above, the skirt portion 8a may desirably be integrated into the rear cover 8 as a portion thereof to achieve smooth flow of cooling air. In this regard, large axial length of the skirt portion may tend to raise the cost of fabricating the mold. Thus, alternative to the present embodiment, the skirt portion 8a may be separately provided in order to reduce the cost of fabricating the mold, and then may be integrated Into the main body cover having no skirt portion 8a, using such technique as welding, bonding or snap fitting. Alternatively, the same effect may be exerted by fixing the skirt portion 8a to the side wall face 52a of the rear housing 52, using such technique as welding, bonding or snap fitting.

The embodiment described above has been based on the case where the high-side radiating fin 62 having the auxiliary fins 62a is used. However, the present invention may be applied to the case where no auxiliary fins 62a are used. Further, in the embodiment described above, the through holes have been formed only in the low-side radiating fin 63, but the through holes may also be formed in the high-side radiating fin 62.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A brushless alternating current generator for vehicles, comprising:
    a stator shaped to have an inner circumferential surface and provided with a stator winding;
    a rotor disposed in the inner bore of the stator to face the inner circumferential of the stator, the rotor having a rotary shaft providing an axial direction along the rotary shaft;
    a field winding that generates magnetic flux to the rotor;
    a rectifier having a plurality of rectifying elements to rectify a voltage from the stator winding and output the rectified voltage, and a radiating fin to which the rectifying elements are attached;
    a housing that has a side wall and houses both the stator and the rotor and has an end face to which electric parts including the rectifier are attached, the side wall being along the axial direction, the end face being along a radial direction perpendicular to the axial direction, and both the side wall and the radiating fin being mutually adjacent to provide a gap therebetween in the radial direction;
    a cover that encloses the end face of the housing and has a plurality of air inlets that takes cooling air into an inside of the cover; and
    an extension member that is secured to the cover and that extends into the gap in the axial direction to provide a distance of 1.5 mm or less between the extension member and the radiating fin.

2. The generator of claim 1, wherein the cover is made of resin.

3. The generator of claim 2, wherein the extension member is part of the cover and produced integrally with the cover.

4. The generator of claim 3, wherein the extension member is shaped as an annular member.

5. The generator of claim 2, wherein the extension member has a tip passing the gap and protruding from the gap in the axial direction and
    wherein, when a distance necessary for air insulation between the side wall and the radiating fin is expressed as L1 and a length of the tip protruded from an end of the radiating fin in the axial direction is expressed as L2, a condition of $L2 \geq L1$ is realized.

6. The generator of claim 1, wherein the extension member has a tip passing the gap and protruding from the gap in the axial direction and
    wherein, when a distance necessary for air insulation between the side wall and the radiating fin is expressed as L1 and a length of the tip protruded from an end of the radiating fin in the axial direction is expressed as L2, a condition of L2≧L1 is realized.

7. The generator of claim 6, wherein the extension member has an end including the tip, the end having a radial thickness becoming thinner as advancing in the axial direction to provide the end with an inclination to the side wall.

8. The generator of claim 1, wherein the extension member has an end whose radial thickness becomes thinner as advancing in the axial direction to provide the end with an inclination to the side wall.

9. The generator of claim 2, wherein the extension member has an end whose radial thickness becomes thinner as advancing in the axial direction to provide the end with an inclination to the side wall.

10. A brushless alternating current generator for vehicles, comprising:
    a stator shaped to have an inner circumferential surface and provided with a stator winding;
    a rotor disposed in the inner bore of the stator so as to face the inner circumferential of the stator, the rotor having a rotary shaft providing an axial direction rotary shaft;
    a field winding that generates magnetic flux to the rotor;
    a rectifier having a plurality of rectifying elements to rectify a voltage from the stator winding and output the rectified voltage, and a radiating fin to which the rectifying elements are attached;
    a housing that has a side wall and houses both the stator and the rotor and has an end face to which electric parts including the rectifier are attached, the side wall being along the axial direction, the end face being along a radial direction perpendicular to the axial direction, and both the side wall and the radiating fin being mutually adjacent to provide a gap therebetween in the radial direction;
    a cover that encloses the end face of the housing and has a plurality of air inlets that takes cooling air into an inside of the cover; and
    an extension member that is secured to the cover and that extends into the gap in the axial direction to provide a distance of 1.5 mm or less between the extension member and the radiating fin,
    wherein the radiating fin comprises a high-side radiating fin to which a plurality of high-side rectifying elements are attached and a low-side radiating fin to which a plurality of low-side rectifying elements are attached,
    the high-side radiating fin has a peripheral portion on which a plurality of auxiliary radiating fins are formed and a plurality of cooling vents each reside between two of the auxiliary radiating fins, each auxiliary radiating fin having a thickness larger in the axial direction than an attachment portion of the high-side radiating fin to which each high-side rectifying element is attached, and
    the extension member is located between the side wall of the housing and the auxiliary rectifying elements in the radial direction.

11. A brushless alternating current generator for vehicles, comprising:
    a stator shaped to have an inner circumferential surface and provided with a stator winding;
    a rotor disposed in the inner bore of the stator to face the inner circumferential of the stator, the rotor having a rotary shaft providing an axial direction along the rotary shaft;
    a field winding that generates magnetic flux to the rotor;
    a rectifier having a plurality of rectifying elements to rectify a voltage from the stator winding and output the rectified voltage, and a radiating fin to which the rectifying elements are attached;
    a housing that has a side wall and houses both the stator and the rotor and has an end face to which electric parts including the rectifier are attached, the side wall being along the axial direction, the end face being along a radial direction perpendicular to the axial direction, and both the side wall and the radiating fin being mutually adjacent to provide a gap therebetween in the radial direction;
    a cover that encloses the end face of the housing and has a plurality of air inlets that takes cooling air into an inside of the cover; and
    an interference member located in the gap and formed to interfere with cooling air passing this gap along the axial direction, wherein the interference member extends into the gap to provide a distance of 1.5 mm or less between the interference member and the radiating fin.

12. The generator of claim 11, wherein the cover is made of resin.

13. The generator of claim 12, wherein the interference member is part of the cover and produced integrally with the cover.

* * * * *